United States Patent [19]
Dexter

[11] 3,834,755
[45] Sept. 10, 1974

[54] AUTOMOBILE SUNSHINE SHADE

[76] Inventor: Carl J. Dexter, 130 Hideaway Ln., West Lafayette, Ind. 47906

[22] Filed: Mar. 9, 1973

[21] Appl. No.: 339,515

[52] U.S. Cl................................ 296/97 G, 248/279
[51] Int. Cl.............................................. B60j 3/02
[58] Field of Search..... 296/97 G, 97 J, 97 K, 97 R; 248/279

[56] References Cited
UNITED STATES PATENTS

| | | | |
|---|---|---|---|
| 1,441,487 | 1/1923 | Doner | 296/97 G |
| 1,695,357 | 12/1928 | Worden | 296/97 K |
| 2,101,901 | 12/1937 | Fletcher | 296/97 G |

FOREIGN PATENTS OR APPLICATIONS

| | | | |
|---|---|---|---|
| 36,659 | 9/1926 | Denmark | 296/97 G |
| 813,235 | 7/1951 | Germany | 296/97 G |

*Primary Examiner*—David Schonberg
*Assistant Examiner*—John A. Pekar
*Attorney, Agent, or Firm*—Woodard, Weikart, Emhardt & Naughton

[57] ABSTRACT

An automobile sunshine shade which is movable downwardly to extend the area of shade. In one embodiment, the shade includes a pair of hollow tubes which slidably receive a pair of stems fixedly mounted to the shade support rod. A spring urges the tubes to a position where the tubes bind on the stems thereby locking the shade in the desired position. In another embodiment, the shade includes a pair of pivotally mounted links which are pivotally secured to the shade support rod. Each link is provided with friction means for locking the shade in the desired position.

3 Claims, 2 Drawing Figures

PATENTED SEP 10 1974 3,834,755

AUTOMOBILE SUNSHINE SHADE

BACKGROUND OF THE INVENTION

1. Field of the Invention

This invention is in the field of automobile sunshine shades.

2. Description of the Prior Art

A representative sample of the prior art includes the following U.S. Pat. Nos.: 3,351,375 Wheeler; 3,534,999 Kesselring; 3,336,073 Leonard; 3,445,135 Masi. The prior art sunshine shades allow the automobile occupant to pivot the sunshine shade from a position adjacent to the windshield to a position adjacent to the side window. In addition, the shades are pivotally mounted about their support rods. In the event that the occupant is short, then the shades are not sufficiently long to provide the desired area of shade. In many cases, the sun reflects off of the hood of the automobile directly into the eyes of the occupant. Thus, it is desirable to provide a sunshine shade which may also be pulled downwardly to the desired position. Disclosed herein are several sunshine shades which provide this feature.

SUMMARY OF THE INVENTION

One embodiment of the present invention is an automobile sunshine shade comprising a rod mountable to an automobile immediately inward and above the windshield of the automobile, an elongated wall to shade an occupant from sunshine, and first means connected to the rod and mounted on the elongated wall operable to allow relative vertical motion between the wall and the rod to allow the wall to be located downwardly from the rod in a position, the means also operable to keep the wall located in the position.

It is an object of the present invention to provide a new and improved automobile sunshine shade. A further object of the present invention is to provide a sunshine shade which may be moved and adjusted in the vertical direction.

Related objects and advantages of the present invention will be apparent from the following description.

DESCRIPTION OF THE PREFERRED EMBODIMENTS

Figure 1:
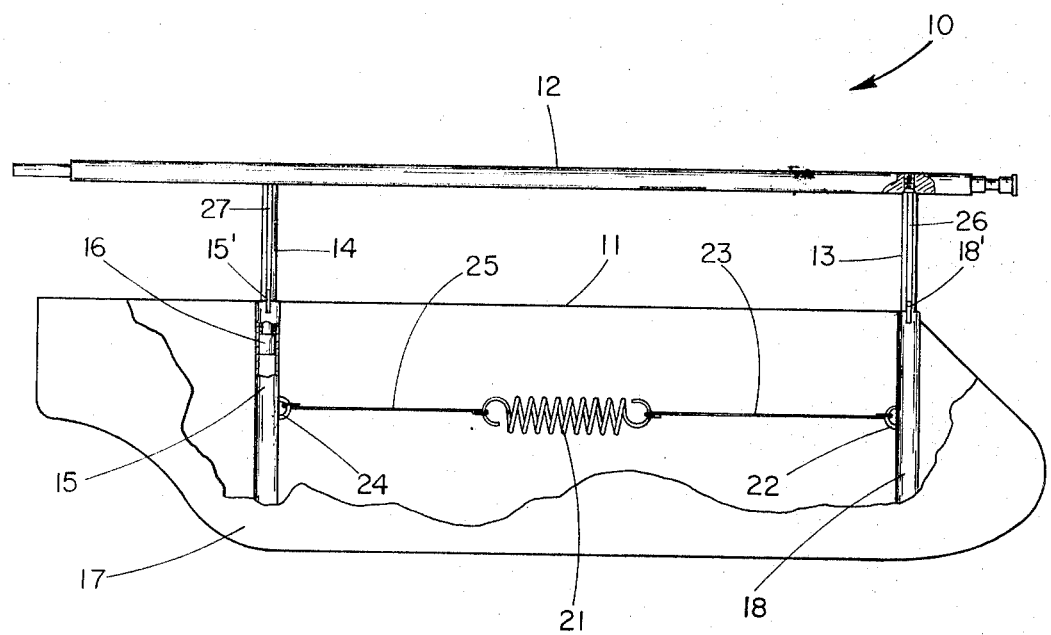
FIG. 1 is a fragmentary side view of one embodiment of a sunshine shade incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an automobile sunshine shade 10 which includes an elongated wall 11 to shade the automobile occupant from the sunshine. Walls 11 and 17 are mounted to rod 12 which in turn is mountable to an automobile immediately inward and above the windshield of the automobile. A pair of stems 13 and 14 are fixedly mounted to rod 12 by means such as a standard fastener. A pair of hollow tubes 15 and 18 are loosely mounted between walls 11 and 17 and slidably receive stems 14 and 13. The bottom ends of tubes 15 and 18 are loosely secured to walls 11 and 17 by bolts or other fastening means. Stems 12 and 13 are in fixed relationship with respect to each other whereas tubes 15 and 18 may be moved slightly toward or away from each other. A helical spring 21 is connected by means of wires 23 and 25 to eyelets 22 and 24 fixedly secured to tubes 18 and 15. Thus, spring 21 urges tubes 15 and 18 together thereby causing the tubes to bind on stems 14 and 13 thereby insuring that wall 11 remains in the desired position with respect to rod 12. Of course, the automobile occupant may overcome the force of spring 21 by merely pushing or pulling on wall 11 with respect to wall 12.

Stems 14 and 13 include longitudinally extending grooves 27 and 26 which slidable receive respectively a pair of fixedly mounted guide projections 15' and 18' which extend into the grooves and which are respectively mounted to the tubes 15 and 18. Each stem 14 and 13 has an enlarged bottom end positioned respectively in tubes 15 and 18 to limit movement of the stems with respect to the tubes. For example, stem 14 has an enlarged end 16 which is shown in the fragmentary view of tube 15. A stop is provided in tube 15 to contact end 16 when walls 11 and 17 are moved to the extended position.

Figure 2:
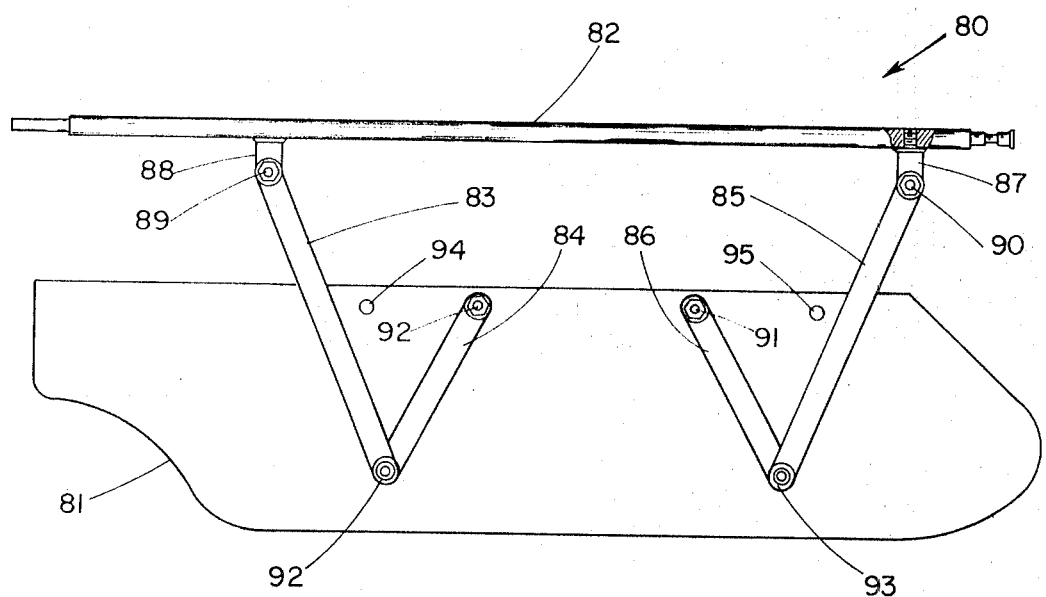
FIG. 2 is a fragmentary side view of an alternate embodiment of a sunshine shade incorporating the present invention.

Another embodiment of the sunshine shade is shown as shade 80 in FIG. 2. Shade 80 includes an elongated wall 81 which is hingedly mounted to support rod 82 by a pair of linkages. The first linkage includes link 84 pivotally mounted to support rod 82 by a pair of linkages. The first linkage includes link 84 pivotally mounted by fastener 92 to wall 81. The opposite end of link 84 is pivotally mounted to end 92 of link 83. The top end of link 83 is pivotally mounted by fastener 89 to bracket 88 secured to rod 82. Likewise, link 86 is pivotally mounted to the elongated wall 81 by fastener 91 and is also pivotally mounted to end 93 of link 85. Link 85 is secured to bracket 87 by fastener 90. A pair of stops 94 and 95 are fixedly mounted to the elongated wall 81 to limit the movement of the linkages. Suitable lock washers are provided at the pivotal locations of the various links in order to allow the sunshine shade to be moved to and located in the proper downward position.

Many variations are contemplated and included in the embodiments described herein. For example, in the embodiment shown in FIG. 2, it is also possible to mount raised strips to the elongated wall to control the movement of the length.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. An automobile sunshine shade comprising:
   a rod mountable to an automobile immediately inward and above the windshield of said automobile;
   an elongated wall to shade an occupant from sunshine;
   first means connected to said rod and mounted on said elongated wall operable to allow relative vertical motion between said wall and said rod to allow said wall to be located downwardly from said rod in a position, said means operable to keep said wall located in said position; and
   said means includes a pair of hollow tubes mounted on said wall and a pair of stems fixedly mounted to said rod and being slidably mounted to said tubes, said stems are in fixed spaced apart relationship, said means further includes spring means connected to said tubes operable to urge said tubes together thereby causing said tubes to bind on said stems to keep said wall located in said position with resepct to said rods.

2. The automobile sunshine shade of claim 1 wherein:
   said stems include longitudinally extending grooves and said tubes, a pair of fixedly mounted guide projections extending into said grooves, said spring means includes a helical spring extending lengthwise between and connected to said tubes.

3. The automobile sunshine shade of claim 2 wherein:
   said stems include enlarged ends limiting movement of said stems with respect to said tubes.

* * * * *